United States Patent
Gasparini et al.

(10) Patent No.: US 8,707,387 B2
(45) Date of Patent: Apr. 22, 2014

(54) SECURE NETWORK COMPUTING

(75) Inventors: Louis A. Gasparini, San Mateo, CA (US); William H. Harris, Jr., Woodside, CA (US); Do-Pil (Don) Park, Redwood City, CA (US)

(73) Assignee: Personal Capital Technology Corporation, Redwood City, CA (US)

( * ) Notice: Subject to any disclaimer, the term of this patent is extended or adjusted under 35 U.S.C. 154(b) by 724 days.

(21) Appl. No.: 12/288,855

(22) Filed: Oct. 22, 2008

(65) Prior Publication Data

US 2010/0100928 A1    Apr. 22, 2010

(51) Int. Cl.
*G06F 21/00* (2013.01)

(52) U.S. Cl.
USPC .................................. 726/1; 726/6; 726/9

(58) Field of Classification Search
USPC .................................. 726/1–2, 6, 9
See application file for complete search history.

(56) References Cited

U.S. PATENT DOCUMENTS

| | | | | |
|---|---|---|---|---|
| 7,047,560 | B2 * | 5/2006 | Fishman et al. | 726/6 |
| 7,266,684 | B2 * | 9/2007 | Jancula | 713/156 |
| 7,552,467 | B2 * | 6/2009 | Lindsay | 726/5 |
| 7,607,008 | B2 * | 10/2009 | Howard et al. | 713/155 |
| 2002/0112170 | A1 * | 8/2002 | Foley et al. | 713/184 |
| 2002/0198848 | A1 * | 12/2002 | Michener | 705/75 |
| 2004/0083393 | A1 * | 4/2004 | Jordan et al. | 713/202 |
| 2007/0094503 | A1 * | 4/2007 | Ramakrishna | 713/172 |
| 2007/0143824 | A1 * | 6/2007 | Shahbazi | 726/1 |
| 2007/0234408 | A1 * | 10/2007 | Burch et al. | 726/6 |
| 2007/0234417 | A1 * | 10/2007 | Blakley, III et al. | 726/12 |
| 2007/0245409 | A1 | 10/2007 | Harris et al. | |
| 2009/0024488 | A1 * | 1/2009 | Romley | 705/26 |
| 2009/0150989 | A1 * | 6/2009 | Hoey et al. | 726/10 |
| 2010/0037046 | A1 * | 2/2010 | Ferg et al. | 713/155 |

* cited by examiner

*Primary Examiner* — Hadi Armouche
*Assistant Examiner* — Dao Ho
(74) *Attorney, Agent, or Firm* — Cascio & Zervas; Anthony T. Cascio; Charles H. Jew

(57) ABSTRACT

A host based security system for a computer network includes in communication with the network a credential host that is operative in concert with a local computer and a destination site. The destination site has a credential authentication policy under which credentials associated with the local computer upon being authenticated authorizes data to be communicated between each of the destination site and the local computer during a communication session over the network. The credential host stores the credentials to be used by the destination and is operative to transmit the credentials onto the network in response to a request received from the local computer. The destination site upon the credentials being received and authenticated thereat is operative to transmit session information onto the network. In turn, the local computer is then operative to commence the communication session upon receipt of said the information.

72 Claims, 3 Drawing Sheets

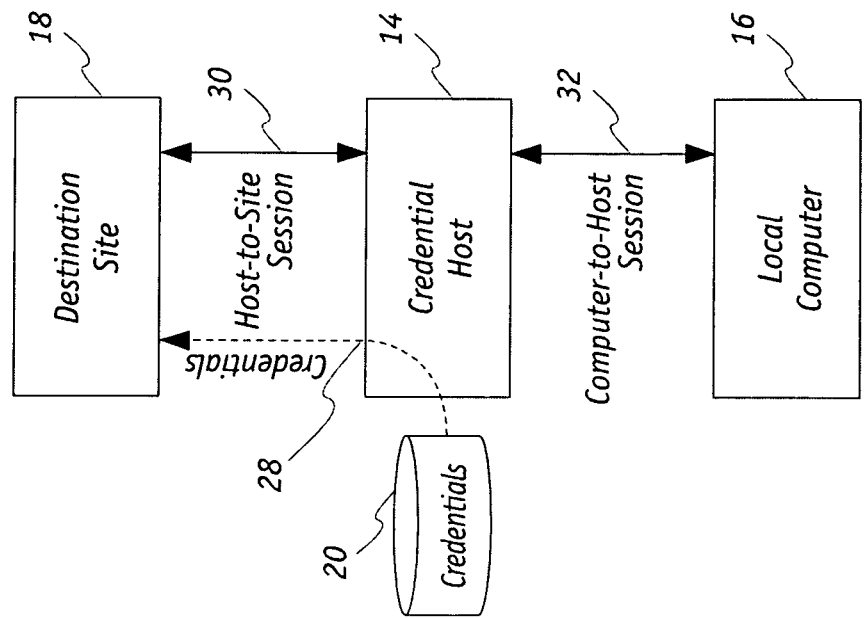
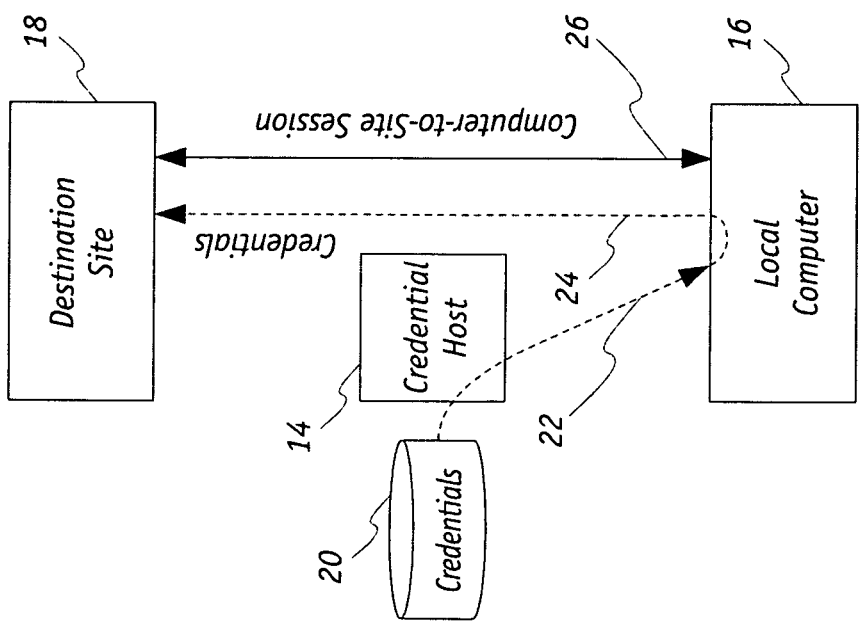

SECURE NETWORK COMPUTING

BACKGROUND OF THE INVENTION

1. Field of the Invention

The present invention relates generally to authentication and authorization in a network communications and more particularly to a host based security system in which credentials may be transmitted from a credential host, which store such credentials, to a destination site on a network server for the authentication of a local computer, which may otherwise be unsecured or compromised, upon request of the local computer to connect to the destination site.

2. Description of the Related Art

Since the release of the web browser client, network communication between computers has become a common daily occurrence for computer users worldwide. Evolving from the nascent days of email and simple web browsing, the Internet has become a public network platform upon which millions of recreational, consumer, business and commercial users daily entrust to bidirectional communication of, for example, their banking and financial data as well as its storage on a remote site. Moreover, this data is most oftentimes confidential, proprietary or personal, and its unauthorized disclosure or misappropriation has been known to result in financial loss to both individuals and enterprises.

Also from these nascent days of the Internet to the present there has existed numerous and varied threats to the security of transmission of this data. These threats manifest themselves as attacks on either the communications carrying such data or the hardware devices themselves that effect such communications. To address these threats, protocols have been developed to secure network communications and an entire network and Internet security industry has evolved to provide both hardware and software security solutions.

In a most basic example of network computing, a user at a local computer initiates, typically through a web browser interface executing on the local computer, a communication session with a destination site in which data is communicated bidirectionally between the local computer and the destination site. During this communication session user data stored at the destination site may be viewed in the web browser interface and information entered into the web browser interface to be communicated to the destination site to modify, add to or delete from the data stored thereat.

As is well known, this communication session is maintained over a connection established between the local computer and the server on which the destination site is stored. This connection is routed along a communication path that encompasses a network of nodes interconnected by a web of links using well known protocols. It is therefor seen that to secure the transmission of data along this communication path to prevent any unauthorized disclosure or misappropriation thereof, protection must be provided at each of the local computer, the server on which destination site is stored and at each node and link along the communication path.

Typically, each of the servers on which destination sites are stored and the links and nodes along the communication path are operated by enterprises for which providing robust security of the servers, links and nodes is a basic necessity. Accordingly, attacks to compromise the security of the communication path to effect the unauthorized disclosure or misappropriation of the data being communicated thereon are most often targeted to the local computer whereat such attacks are relatively easier to effect. These attacks usually are effected through the installation on the local computer of malware, which is malicious computer software that interferes with normal computer functions of the local computer or that sends personal user data stored on the local computer or entered into the web browser interface to unauthorized parties over the network.

The local computer becomes the frequent target of attacks because many of the local computers connected to the Internet are owned or operated by users many of whom, whether through negligence, recklessness, inattentiveness or lack of appreciation of Internet threats, forgo the installation of widely available security software thereby leaving their own local computer vulnerable to such attacks. Other users of the local computers may install such security software but may be mistaken in their belief that their own local computer is properly secured by such software. For example, many users who do install security software may through negligence or lack of technical expertise fail to properly configure such software upon its initial installation or obtain available updates as such become available to protect against the latest discovered threats.

Even a user of high technical expertise may be unaware of the presence of malware despite the presence of properly configured and updated security software. Sophisticated malware has been known to be specifically written to avoid detection from most common consumer security software. The local computer may be compromised although the user believes otherwise from an apparent lack of warning or other indication from installed security software that is relied upon to monitor and assess security risks.

Malware can be surreptitiously installed on the local computer typically from downloading and opening content from compromised or malicious destination sites or inadvertently from opening an attachment in an email. Malware can also be installed on the local computer from the network should a scan from a remote site reveal an open port to the local computer through which a direct connection thereto can be made.

Other local computers may also be those as provided for use to the general public, such as those provided by public libraries or hotels. Not only may these public local computers have their security compromised as set forth above, but more insidiously by a malicious user who can readily install malware directly on any such public local computer as the use of these computers is generally unsupervised.

Of primary concern herein is malware that sends personal and confidential data about the user from the user's local computer to unauthorized parties over the network. One example of this type of malware captures user credentials, such as through keystroke loggers, as they are being entered into the web browser interface when such credentials are needed to be transmitted to a destination site for authentication thereat prior to access of the user data stored at such site. Once a user's credentials have been obtained through malware, the destination site can be accessed by such unauthorized users from any other computer wherever located to obtain and misappropriate such confidential and private user data.

Similarly, such malware can also capture other sensitive data of the user being entered at the local computer subsequent to the credentials being authenticated. For example, financial information, such as relating to credit card numbers or account numbers for banks and other financial institutions, may also be logged as entered in the web browser interface. As stated above, misappropriation of any of this data can result financial loss to the user whose credentials have been misappropriated.

Accordingly, a need exists to provide a system or method which enables user credentials to be sent to a destination site to authenticate a local computer while minimizing the possibility of such credentials being surreptitiously captured at the local computer and transmitted to unauthorized users. Yet another need exists to provide a system or method which enables user private information to be sent a destination site to effect commerce thereat while also minimizing the possibility of such user private information being surreptitiously captured at the local computer and transmitted to unauthorized users. This need is met by the inventions disclosed and claimed below.

SUMMARY OF THE INVENTION

It is accordingly an object of the present invention to provide a method and apparatus in which user credentials are sent to a destination site to authenticate a local computer while minimizing the possibility of such credentials being surreptitiously captured at the local computer and transmitted to unauthorized users.

It is a further object of the present invention to provide a method and apparatus in which user private information is sent a destination site to effect commerce thereat while also minimizing the possibility of such user private information being surreptitiously captured at the local computer and transmitted to unauthorized users.

In accordance with one embodiment of the present invention, a host based security system for a computer network includes in communication with such network a credential host that is operative in concert with a local computer and a destination site. The destination site has a credential authentication policy under which credentials associated with the local computer upon being authenticated authorizes data to be communicated between each of the destination site and the local computer during a communication session over the network. The credential host stores the credentials to be used by the destination and is operative to transmit the credentials onto the network in response to a request received from the local computer. The destination site upon the credentials being received and authenticated thereat is operative to transmit session information onto the network. In turn, the local computer is then operative to commence the communication session upon receipt of said the information.

In accordance with another embodiment of the present invention, a host based security method for a computer network including the step of transmitting credentials into the network from a credential host at which the credentials are stored in response to a request received from a local computer in communication with said network. Such method includes the next step of receiving the credentials at a destination site in communication with the network. The destination site has a credential authentication policy under which credentials associated with the local computer upon being authenticated authorizes data to be communicated between each of the destination site and the local computer during a communication session over the network. Finally, such method includes the step of transmitting session information onto the network from the destination site upon the credentials being received and authenticated thereat. The local computer is operative to commence the communication session upon receipt of the session information.

A feature of the present invention is that by storing the credentials at the credential host and transmitting them therefrom, the primary object of the present invention is met by providing enhanced safeguarding and security from misappropriation of credentials, which typically occurs at the local computer, when such credentials are needed to be used by the destination site for authentication of the local computer. Thus, a user can access the destination site from any local computer wherever located, no matter how unsecured such computer is. Irrespective of the local computer being the user's own computer or a public computer, upon the user needing credentials to be sent to the destination site, such credentials are advantageously sent from a secure credential host and not subject to misappropriation at the local computer.

The principles of the present invention, in further embodiments of the present invention may also be applied to any information that is typically required to be entered at the local computer for transmission to the destination site. In such cases, such information may also be stored at the credential hosts, and when such information is needed to be entered at the local computer, alias information, exemplarily such as a predetermined alphanumeric character string, may instead be sent and intercepted by the credential host, which then substitutes the correct information for the alias information for transmission on to the destination site. Accordingly, the present invention mitigates against misappropriation and misuse of user information by advantageously minimizing the need for such information to ever be stored at, or be transmitted from, the local computer, even if such local computer is attacked or otherwise compromised by malware.

These and other objects, advantages and features of the present invention will become readily apparent to those skilled in the art from a study of the following Description of the Exemplary Preferred Embodiments when read in conjunction with the attached Drawings and appended Claims.

BRIEF DESCRIPTION OF THE DRAWING

FIG. 2A is a schematic block diagram showing redirection of the credentials from the credential host through the local computer to the destination site;

FIG. 2B is a schematic block diagram showing replication of a communication session between the credential host and destination site to a communication session between the credential host and the local computer;

DESCRIPTION OF THE EXEMPLARY PREFERRED EMBODIMENTS

Figure 1:
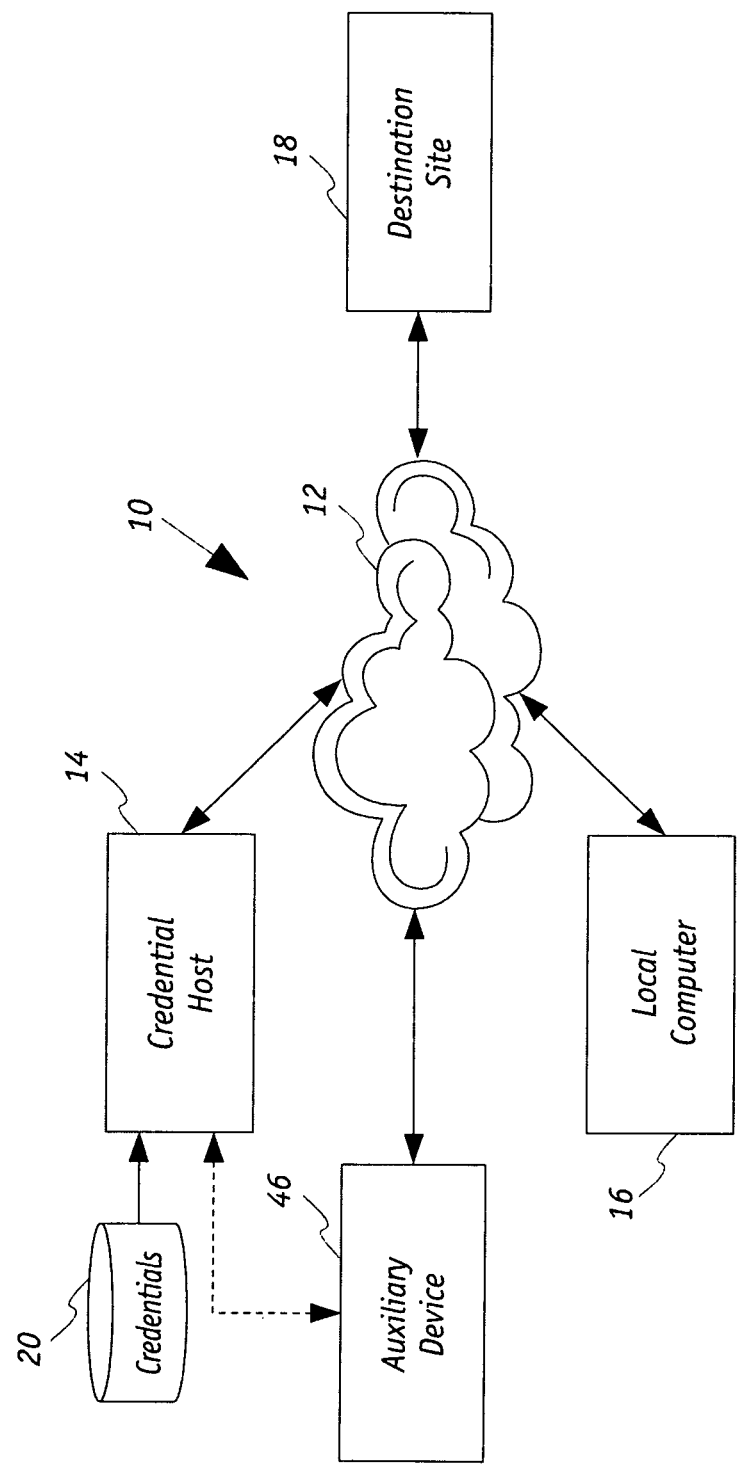
FIG. 1 is a schematic block diagram of a host based security system constructed according to the principles of the present invention.

Referring now to FIG. 1, there is shown a host based security system 10 for a computer network 12. The host based security system 10 includes a credential host 14 that, in concert with a local computer 16 and a destination site, provides enhanced safeguarding and security from misappropriation of credentials associated with the local computer 16 when such credentials are needed to be used by the destination site 18 for authentication of the local computer 16. Each of the credential host 14, local computer 16 and the destination site 18 are in communication with the network 12 and therefore in communication with each other.

As is known, the destination site 18 may have a credential authorization policy under which credentials, which are associated with the local computer 16, upon being authenticated authorizes data to be communicated between each of the destination site 18 and the local computer 16 during a communication session over the network 12. Credentials associated with the local computer 16 include without limitation any credentials that are personal to a user of the local computer 16 as well any credentials specific to the local computer 16.

In accordance with the present invention, the credentials associated with the local computer 16 are stored at the credential host 14, exemplarily as best seen in FIG. 1, on a computer readable medium 20. It is to be understood that additional local computers similar to local computer 16 may be in communication with the network 12 and that the credential associated with each of the additional local computers or the users of such additional computers may also be stored and indexed at the credential host 14 in a known relational database. Credentials, which are personal to a user, allow a user to use any available local computer in communication with the network 12, and thus such credentials become associated with the local computer being used.

In the broadest aspect of the present invention, the credential host 14 is operative to transmit the credentials associated with the local computer 16 onto the network in response to a request received over the network 12 from the local computer 16. The destination site 18 upon the credentials being received and authenticated thereat is operative to transmit session information onto the network 12. The local computer 16 is operative to commence the communication session upon receipt of the session information.

The host based security system 10 as described above can be implemented in several different embodiments. Exemplarily, such embodiments include redirection of the credentials from the credential host 14 through the local computer 16 then to the destination site 18; replication of a communication session between the credential host 14 and destination site 18 to a communication session between the credential host 14 and the local computer 16; transfer of a communication session initiated between the credential host 14 and the destination site 18 to a communication session between the local computer 16 and the destination site 18; and a shared session in which a communication session between the credential host 14 and the destination site 16 is mirrored between the credential host 14 and the local computer 16. For enhanced security, any of the above sessions may be an SSL session.

Referring now to FIG. 2A, there is shown a redirection of the credentials from the credential host 14 through the local computer 16 and then to the destination site 18. The credential host 14 transmits the credentials onto the network, as described above, and the credentials received at the local computer 16, as indicated at 22. The credentials are retransmitted, using known redirect techniques, from the local computer 16 over the network 12 to the destination site 18, as indicated at 24. Upon receipt and authentication of the credentials at the destination site 18, the session information developed thereat is transmitted and received at the local computer 16 and the communication session is thereby established between the local computer 16 and destination site 18, as indicated at 26.

The session information, as in known, includes inter alia at least one session cookie issued by the destination site 18 and placed at the local computer 16. The session cookie is indicative that the credentials associated with the local computer 16 have been authenticated.

Although the credentials are redirected through the local computer 16, the credentials are not stored nor entered at the local computer 16, thereby substantially eliminating risk of misappropriation from malware at the local computer 16. Furthermore, since the credentials are preferably transmitted over a SSL session, the possibility that such credentials can be read at another location in the network 12 is also substantially minimized.

Referring now to FIG. 2B, there is shown a replication of a communication session between the credential host 14 and destination site 18 to a communication session between the credential host 14 and the local computer 16. The credential host 14 transmits the credentials onto the network, as described above, and the credentials are then received at the destination site, as indicated at 28. Upon receipt and authentication of the credentials at the destination site 18, the session information developed thereat is transmitted and received at the credential host 14, and the communication session is thereby established between the credential host 14 and the destination site 18, as indicated at 30.

Next, a further communication session, as indicated at 32, is established over the network 12 between the credential host 14 and the local computer 16. Using known techniques, the data communicated in the communication session between the credential host 14 and the destination site 18 is replicated and transmitted in the further communication session between the local computer 16 and the credential host 14.

In the embodiment of FIG. 2B, the session information also includes an address of a location at the destination site 18 in addition to the session cookie. The data transmitted in the communication session between the credential host 14 and the destination site 18 associated with this address. This address is translated at the credential host such that the data replicated in the further communication session between the credential host 14 and the local computer 16 is associated with the translated address.

In one aspect of the embodiment of the present invention, the credential host 14 may store the session information for the communication between the credential host and the destination site. The credential host 14 then develops new session information for a second communication session between the credential host 16 and the local computer 16.

Furthermore, the credential host 14 may be operative to inspect data transmitted in the communication session and implement predetermined rules in the event predetermined information at the destination site 18 is selected prior to the predetermined information being acted upon at the destination site 18. Such predetermined information may include a preselected web page at the destination site 18 or a preselected hyperlink in a web page at the destination site 18.

In addition thereto, the host-based security system 10 may further comprise an auxiliary device 46 associated with a user of the local computer 16 and adapted for communication with the credential host 14. One or more of the predetermined rules may require additional credentials associated with the user to be entered at the auxiliary device 46 and transmitted to the credential host 14 upon selection of the predetermined information. The predetermined information is then acted upon only in the event the additional credentials are authenticated at the credential host 14.

The credential host 14 may also store personal information of the user of the local computer 16 in association with an alphanumeric character string, which is enterable by the user at the local computer 16 and transmittable to the credential host 14 using known techniques. In response to receipt of the character string, the credential host 14 is operative to transmit the personal information associated with the character string to the destination site 18.

Figure 2D:
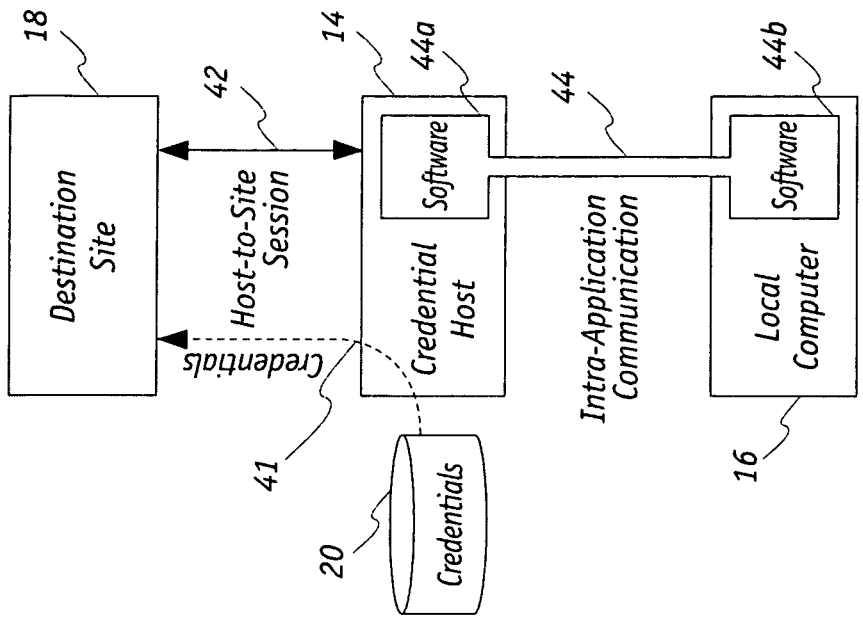
FIG. 2D is a schematic block diagram showing a shared session in which a communication session between the credential host and the destination site is mirrored between the credential host and the local computer.
Figure 2C:
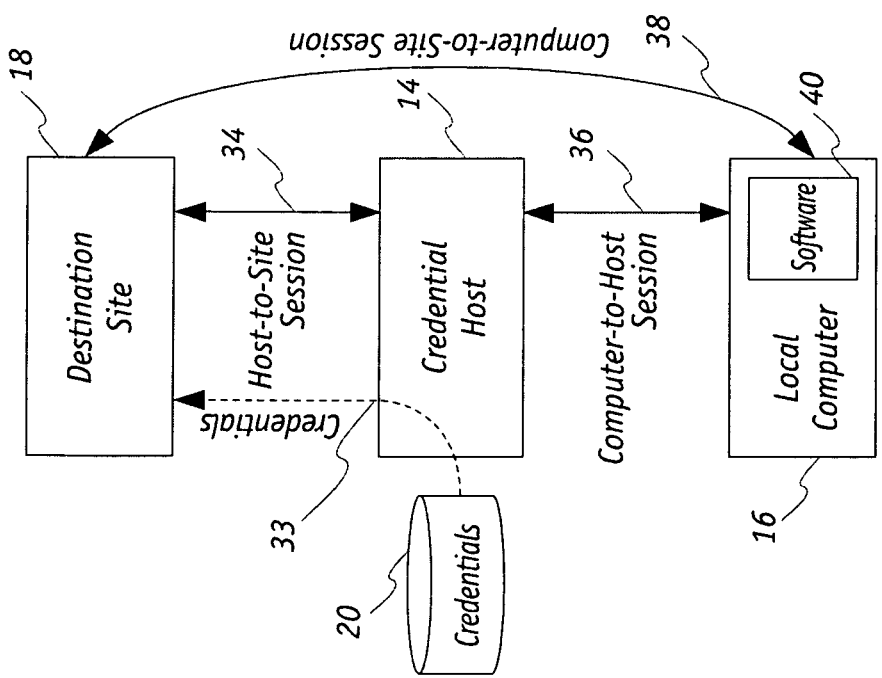
FIG. 2C is a schematic block diagram showing transfer of a communication session initiated between the credential host and the destination site to a communication session between the local computer and the destination site.

Referring now to FIG. 2C, there is shown a transfer of a communication session initiated between the credential host 14 and the destination site 18 to a communication session between the local computer 16 and the destination site 18. The credential host 14 transmits the credentials onto the network, as described above, and the credentials are then received at the destination site 18 as indicated at 33. Upon receipt and authentication of the credentials at the destination site 18, the session information developed thereat is transmitted and received at the credential host 14 over the host-to-site session, as indicated at 34. The credential host 14 next transmits the session information to the local computer 16 over a computer-to-host session, as indicated at 36, and the communication session is thereby established between the local computer 16 and the destination site 18, as indicated at 38.

The session information, similarly as described above, includes at least one session cookie issued by the destination site 18 upon authentication of the credentials thereat and an address of an entry location at the destination site 18. The request, described above with reference to FIG. 1, in the present embodiment of FIG. 2C, is a request to connect to the destination site that is first transmitted over the computer-to-host session 36 and then transmitted over the host-to-site session 34 from the credential host 14.

The embodiment of FIG. 2C advantageously reduces bandwidth requirements imposed upon the credential host 14 in comparison to the session replication embodiment of FIG. 2B. Furthermore, session replication may cause some functions implemented in web pages at the destination site 18 to fail to render properly and execute at the local computer 16. This failure mode is obviated by the embodiment of FIG. 2C.

In the embodiment of FIG. 2C, there may be a software module 40 installed on the local computer 16. The software module 40 may typically be any of a browser plug-in, a stand-alone application or custom browser. As described in greater detail below, the features of the software module 40 may be implemented by preference settings within existing browsers, attached proxy, secure browser or secure on-line application.

The software module 40 watches for attempts to access the destination site 18, such as through a URL for the destination site 18 being resolved. The software module 40 then transfers such attempts to the credential host 14, which in turn connects to the destination site 16 to initiate the credential authentication as described above. The functions performed by the software module 40 thus exemplarily include URL vetting, proxy, DNS setting and authentication functions, the implementation of such functions are well known and need not be further described herein.

One particular implementation of the software module 40 functions to point the DNS settings of the local computer 16 to the DNS settings of the credential host 14. Accordingly, the credential host 14 resolves domains of the destination site 18 and routes the communication session through the credential host 14. By pointing the DNS settings as described, the credential host 14 need not rewrite URL's but may however need to inject root certificates into the browser of the local computer 16.

Another particular implementation of the software module 40 is implemented as a proxy controlled by the credential server 14. In this implementation, the software module 40 obtains instructions from the credential host 14, in advance or in-line, whether to rewrite each URL to a URL controlled by the credential host 14. Because the software module 40 can rewrite the host controlled URL back to the original URL before returning a response to the browser on the local computer 16, the root certificate of the credential host 14 is not necessary in the browser. The communication session, when transferred from the host-to-site session 34 to the communication session 38 includes the session ID and cookies transferred to the local computer 16.

In an environment on the local computer 16 in which other proxies are present, the software module 40 is preferably an attached proxy to the browser of the local computer 16, such that it intercepts all traffic emanating from the browser prior to being directed to any other pre-existing proxy. Otherwise traffic control can be embedded in the browser by plug-in or other known modification to implement the software module 40.

Alternatively, the software module 40 may be a secure browser on the local computer 16 in which the credential host 14 is allowed to control traffic flow. In addition thereto, the software module 40 may be a secure online application that supports interactivity with the credential host 14 and the destination site 18, including traffic control and other know security measures.

Referring now to FIG. 2D, there is shown a shared session in which a communication session between the credential host 14 and the destination site 16 is mirrored between the credential host 14 and the local computer 16. The credentials are received at the destination site 18, as indicated at 41, and the session information is received at the credential host 14 such that the communication session, as indicated at 42, is established over the network 12 between the credential host 14 and the destination site 18.

Without any further session being initiated, the credential host 14 extends, or otherwise shares, access to the communication session 42 to the local computer 16. The local computer 16 may then interact with the data communicated over the communication session 42. In one embodiment, the credential host 16 includes a browser in which data transmitted in the communication session is rendered. This rendered data may then be mirrored at the local computer 16. Session information is similar as described above.

There are several advantages to the shared session embodiment of FIG. 2D. One such advantage is that only one communication session is required. Furthermore, under certain circumstances when transferred or proxy sessions are used, some web pages may fail to render properly at the local computer 16. The shared session embodiment of FIG. 2D obviates this failure mode. Another distinct advantage of the shared session embodiment is that, since there is no active communication session between the local computer and either of the credential host 14 or the destination site 18, protection against any malware that may have been surreptitiously installed at the local computer 16 is enhanced.

One implementation of the shared embodiment of FIG. 2d, the credential host 14 and the local computer 16 may each include executable components 44a, 44b of a distributed network or split browser 44. The split browser 44 thus executes partially on the credential host 14 and partially the local computer 16.

In the split browser embodiment, components of the split browser residing at the local computer 16 manage display and input and components of the split browser residing at the credential host 14 manage authentication. The communication session between the credential host 14 and the destination site 18 may also be an SSL session. Moreover, the interfaces of the components are communicated between the local computer 16 and the credential host 14 through an application level tunnel.

In any of the above described embodiments of the host based security system 10 as set forth above, the credential host 14 may be further operative to transmit to the destination site 18 additional information associated with the credentials. The additional information is associated with a user of the local computer 16 such that the credentials received at the destination site are validated as being associated with the user. This advantageously provides yet another layer of protection when attacks are made at other than the local computer 16.

In order to provide the additional information, the host based security system 10 may further include the auxiliary device 46, described above, associated with the user which is in communication with the credential host 14. The additional information may then be developed at the credential host 14 in response to the auxiliary device 46 being authenticated by the credential host.

For example, the additional information may be a token. For additional security, the token may encrypted using a key known only to the credential host 16 and the destination site 18 and may also expire upon expiration of a selected time duration.

In an initial setup of the host based security system 10, the credentials include a User ID and an initial password associated with the user of the local computer 16 and as such user may have originally registered such credentials with the destination site 18. To further security of these credentials, the credential server 14 upon the credentials being stored at thereat may register a subsequent password at the destination site 18 to replace the initial password. In such event, even if the local computer 16 had been compromised by malware and the User ID and initial password misappropriated, such initial password would now be invalid for authentication at the destination site 18, and the new password would not have ever been stored at or passed through the local computer thereby shielding it from misappropriation.

The credential server 14 may also store private user information associated with the credentials that is made available to the destination site 18 during the communication session. Exemplary private information may be any of account numbers of financial institution and credit cards, or any other type of information personal to the user of the local computer 16 that is required to access information or conduct transactions at the destination site 18, the misappropriation of which would cause harm or loss to such user.

Yet another level of security may be added to the host based security system 10 in which the local computer 16 is authenticated by the credential host 14 prior to the request for connection to the destination site 16 being received from the local computer 16. For example, the local computer 16 may be authenticated by auxiliary credentials received from the auxiliary device 46 associated with a user of the local computer wherein the auxiliary device 46 is in communication solely with the credential host 14.

For example, the user may enter such auxiliary credentials into the axillary device 46 prior to causing the local computer 16 to send the request to connect to the destination site 16. In such embodiment, the user is secure even if the local computer 16 is a public computer as may be found in a public library or hotel lobby.

The auxiliary device 46 from which the auxiliary credentials are received may further be selected in accordance with rules established by the user in accordance with the local computer 16 currently operated by the user. For example, if the local computer 16 is one such public computer, the rules may specify that the auxiliary device 46 be a cell phone or other such wireless personal digital assistant carried by the user.

Another layer of security may be added to the host based security system 10 to warn of credentials being sent to the destination site 18 that the user of the local computer 16 may not otherwise know of. More specifically, the credential host 14 upon transmission of the credentials to the destination site 18 transmits predefined information to the auxiliary device 46 associated with the user who owns such credentials. Should the user's master account with the credential host somehow be compromised and a request is sent form any computer not under control of the user, the user will be notified of the attempt. Otherwise, even if such attempt is authorized, the user has knowledge of the access.

The auxiliary device 46 may exemplary be any cell phone, personal digital assistant or even another local computer. The type of auxiliary device may further be selected in accordance with which destination site 18 is requested. Furthermore, the predefined information may be established to be sent only when a selected destination site 18 is requested.

As described above, the user establishes a master account with the credential host 14 such that the credential host 14 stores the user's credentials for each destination site 18 that the user has determined. The user prior to requesting any destination site 18 first logs into the credential host 14, such that when credentials are requested by the destination site 18, the credential host 14 intercepts and sends the credentials to the destination site 18 instead of the user at the local computer 16 entering such credentials and transmitting them therefrom.

When the user is at a local computer that is otherwise not secure, such as a public computer in a hotel or library, or is using a secure computer such as the user's own laptop but in an otherwise unsecured area such as a public WiFi hot spot, a risk of misappropriation of the user ID and password that the user needs to log into the credential host 14 arises. In this event, the auxiliary device 46 may also be used to enter this user ID and password, or just the password with the user ID entered at the local computer 16.

In a further embodiment of the present invention, the credential host 14 has its own credential authentication policy under which credentials associated with the user of the local computer 16 upon being authenticated authorizes the credential host 14 to be responsive to the request received from the local computer 16 to connect with the destination site 18. The auxiliary device 46, associated with the user is in communication with the credential host 14 from which the user credentials, password, or user ID and password, may be sent.

When only the password is to be sent from the auxiliary device 46, the credential host 14 signals the auxiliary device 46 upon receipt of the user ID from the local computer 16. The user reacts to this signal and enters the password at the auxiliary device 46 and causes it to be set to the credential host 14. Accordingly, the auxiliary device 46 may be cell phone or personal digital assistant and the password may be a numeric personal identification number.

Similarly, after a communication session between the local computer 16 and the destination site 18 has been established as in any of the above described embodiments of the host based security system 10, the auxiliary device 46 associated with the user of the local computer 16 and in communication with the credential host 14 may also be used to send to the destination site 18 form field information for which misappropriation from an otherwise compromised local computer 16 would entail serious risk for the user. When the data to be communicated between the local computer 16 and the destination site 18 includes such form fields, the credential host 14 may intercept and route the form fields to the auxiliary device 46. The user then enters information into the form fields at the auxiliary device 46 for transmission to the destination site 18.

Various rules may be established for which form fields are to be so routed. Certain form fields may be pre-identified as always to be routed to the auxiliary device 46, especially in the event the information to be entered into the form fields is associated with personal financial information of the user.

When the local computer 16 is operated by one of a plurality of authorized users, all of whom have a master account with the credential host 14, the credentials associated with the local computer 16 are accordingly unique for each of the users. The credentials for each of these users are stored at the credential host 14 in association with the destination sites 18 at which the credentials are to be authenticated, and stored also in association each of the users.

In this event, it is possible to also select the data that is to be communicated between the local computer 16 and the destination site 18 in accordance with the credentials for each one of the users. For example, members of a household may each have their own credentials for the same destination site 18. Access to certain areas of the destination site 18 may be controlled by rules established at the credential host 14, as all data to be communicated in the communication session between the local computer 16 and the destination site 18 goes through the credential host 14. For example, family account information on a banking or commerce site may be limited to read only for some of the users whereas other users may conduct transactions at such site.

In some embodiments of the host based security system 10, the destination site 18 may be nonsupportive of receipt of the credentials from the credential host 14 but instead the destination site 18 sends a form field into which such credentials are to be entered such that the destination site transmits to the local computer a form field into which the credentials are to be entered, the credential host storing an alphanumeric character string in association with the credentials, the string being entered into the form field and transmitted from the local computer, the credential host substituting the string for the credentials to transmit to the destination site.

Similarly as described above, the credential host may also store personal information of the user of the local computer 16 in association with an alphanumeric character string. When the destination site 18 transmits to the local computer 16 a further form field into which the personal information is normally entered, the further character string is entered by the user at the local computer 16 into this further form field and transmitted to the credential host 14. The credential host 14 then transmits the personal information associated with the character string in the further form field to the destination site 18 in response to receipt of the character string.

To enable the user of the local computer 16 to monitor security, the credential host 14 may maintain a transaction history, which may also be user configurable. For example, the transaction history may include an identification of any local computer 16 in which any communication session has been established with any destination site 18. Such identification is readily determined by a cookie stored at the local computer 16. Furthermore, the transaction history may include an identification of information accessed at the destination site.

In the embodiments above described, the credential host may further send information personal to the user of the local computer 16 to the destination site 18. To secure such information it may expire upon expiration of a selected time duration. For example, such information may be an identification of a financial instrument. Added security may be added by encrypting such personal information using a key known only to the credential host 14 and the destination site 18.

There have been described herein above novel apparatuses and methods for a host based security system for a computer network. Those skilled in the art may now make numerous uses of and departures from the herein above described embodiments without departing from the inventive principles disclosed herein. Accordingly, the present invention is to be defined solely by the lawfully permissible scope of the appended Claims.

What is claimed as the invention is:

1. A host based security system for a computer network comprising:
   a local computer in communication with said network;
   a destination server in communication with said network, said destination server having a credential authentication policy;
   a credential host in communication with said network, said credential host being operative to transmit credentials associated with a user of said local computer onto said network in response to a request initiated at said local computer to connect to said destination server, said destination server upon said credentials being received and authenticated in accordance with said authentication policy being operative to transmit session information onto said network for receipt at said credential host which upon receipt thereof is further operative to retransmit said session information to said local computer; said local computer upon receipt of said session information having a communication session operatively established with said destination server such that during said communication session said local computer is authenticated to communicate data bi-directionally with said destination server in accordance with said session information; and
   an auxiliary device associated with said user of said local computer, said credential host having a credential authentication policy under which credentials associated with said user of said local computer, wherein said credentials associated with said user includes a user ID and a password, upon being authenticated authorizes said credential host to be responsive to said request initiated by said local computer, said auxiliary device being in communication with said credential host, said credentials being transmitted to said credential host upon user ID being entered at said local computer and said password being entered at said auxiliary device.

2. A host based security system as set forth in claim 1 wherein said credential host is operative to transmit to said destination server additional information associated with said credentials, said additional information being associated with said user of said local computer such that said credentials are validated as being associated with said user.

3. A host based security system as set forth in claim 2 wherein said host based security system further includes an auxiliary device associated with said user and in communication with said credential host, said additional information being developed at said credential host in response to said auxiliary device being authenticated by said credential host.

4. A host based security system as set forth in claim 2 wherein said additional information is a token.

5. A host based security system as set forth in claim 4 wherein said token is encrypted using a key known only to said credential host and said destination server.

6. A host based security system as set forth in claim 4 wherein said token expires upon expiration of a selected time duration.

7. A host based security system as set forth in claim 1 wherein said session information includes at least one session cookie issued by said destination server upon authentication of said credentials and an address of a location at said destination server.

8. A host based security system as set forth in claim 1 wherein a computer-to-host communication session exists over said network between said local computer and said credential host and a host-to-site communication session exists over said network between said credential host and said destination server, and further wherein said request is a request to connect to said destination server transmitted from said local computer over said computer-to-host communication session and retransmitted from said credential host over said host-to-site communication session.

9. A host based security system as set forth in claim 8 wherein each of said communication session between said local computer and said destination server and said further communication session between said credential host and said local computer is an SSL session.

10. A host based security system as set forth in claim 8 wherein DNS settings of said local computer are pointed to DNS settings of said credential host such that said credential host resolves domains of said destination server and corresponding IP addresses of said destination server and routes said communication session with said domains through said credential host.

11. A host based security system as set forth in claim 8 wherein said local computer includes a proxy controlled by said credential host such that data communicated between said local computer and said destination server during said communication session is routed through said credential server for selected ones of URLs controlled by said credential host.

12. A host based security system as set forth in claim 8 wherein said local computer includes a proxy controlled by said credential host such that data communicated between said local computer and said destination server during said communication session is routed through said credential server.

13. A host based security system as set forth in claim 1 wherein said credentials include a User ID and an initial password associated with said local computer and originally registered with said destination server, said credential server upon said credentials being stored at thereat registering a subsequent password at said destination server to replace said initial password.

14. A host based security system as set forth in claim 13 wherein said credential server further stores private user information associated with said credentials, said private user information being available to said destination server during said communication session.

15. A host based security system as set forth in claim 1 wherein said local computer is authenticated by said credential host to communicate therewith prior to said request being received from said local computer.

16. A host based security system as set forth in claim 15 wherein said local computer is authenticated by auxiliary credentials received from a device associated with said user of said local computer wherein said device is in communication solely with said credential host.

17. A host based security system as set forth in claim 16 wherein said device from which said auxiliary credentials are received is selected in accordance with rules established by said user in accordance with said local computer currently operated by said user.

18. A host based security system as set forth in claim 1 wherein said credential host upon transmission of said credentials to said destination server further is operative to transmit predefined information to a device associated with said user of said local computer.

19. A host based security system as set forth in claim 18 wherein said device is selected in accordance with said destination server.

20. A host based security system as set forth in claim 18 wherein said predefined information is transmitted only for a selected destination server.

21. A host based security system as set forth in claim 1 wherein said credential host maintains a transaction history.

22. A host based security system as set forth in claim 21 wherein said transaction history is user configurable.

23. A host based security system as set forth in claim 22 wherein said transaction history includes an identification of said local computer in which said communication session has been established with said destination server.

24. A host based security system as set forth in claim 23 wherein said identification is determined by a cookie stored at said local computer.

25. A host based security system as set forth in claim 23 wherein said transaction history includes an identification of information accessed at said destination server.

26. A host based security system as set forth in claim 1 wherein said credential host further sends information that is personal to said user of said local computer to said destination server.

27. A host based security system as set forth in claim 26 wherein said personal information expires upon expiration of a selected time duration.

28. A host based security system as set forth in claim 26 wherein said personal information is an identification of a financial instrument.

29. A host based security system as set forth in claim 28 wherein said personal information is encrypted using a key known only to said credential host and said destination server.

30. A host based security system as set forth in claim 1 wherein said credential host in response to said user ID being received thereat signals said auxiliary device at which said user is prompted to enter said password.

31. A host based security system as set forth in claim 30 wherein said auxiliary device is one of a telephone and personal digital assistant.

32. A host based security system as set forth in claim 1 further comprising an auxiliary device associated with said user of said local computer, said auxiliary device being in communication with said credential host, said data to be communicated between said local computer and said destination server including form fields to be transmitted from said destination server, said credential host routing said form fields to said auxiliary device at which said user enters information into said form fields for transmission to said destination server.

33. A host based security system as set forth in claim 32 wherein said form fields are pre-identified as always to be routed to said auxiliary device, said information to be entered into said form fields being associated with personal financial information of said user.

34. A host based security system as set forth in claim 1 wherein said local computer is operated by one of a plurality of users, said credentials associated with said local computer being unique for each of said users, said credentials being stored at said credential host in association with said destination server at which said credentials are to be authenticated and further in association each of said users such that said data to be communicated between said local computer and said destination server is further selectable in accordance with said credentials for each one of said users.

35. A host based security system as set forth in claim 1 wherein said destination server is non-supportive of receipt of said credentials from said credential host such that said destination server transmits to said local computer a form field into which said credentials are to be entered, said credential host storing an alphanumeric character string in association with said credentials, said string being entered into said form field and transmitted form said local computer, said credential host substituting said string for said credentials to transmit to said destination server.

36. A host based security system as set forth in claim 35 wherein said credential host stores personal information of said user of said local computer in association with a further alphanumeric character string and further wherein said destination server transmits to said local computer a further form field into which said personal information is normally entered, said further character string being enterable by said user at said local computer into said further form field and transmittable to said credential host, said credential host being operative to transmit said personal information associated with said character string in said further form field to said destination server in response to receipt of said character string.

37. A host based security method for a computer network wherein a local computer initiates a request to connect to a destination server in which the destination server has a credential authorization policy under which credentials of a user of said local computer are authenticated at said destination sever, said user credentials including a user ID and a password, said method comprising steps of:
    entering at said user computer said user ID and at an auxiliary device said password and transmitting said user ID and said password to a credential host, said credential host upon said user credentials being authenticated thereat authorizes said credential host to be responsive to said request initiated by said local computer;
    transmitting said user credentials from said credential host to said destination server;
    transmitting session information onto said network from said destination server for receipt at said credential host upon said credentials being received and authenticated at said destination server in accordance with said authentication policy; and
    retransmitting said session information from said credential host onto said network for receipt at said local computer, said local computer upon receipt of said session information having a communication session operatively established with said destination server such that during said communication session said local computer is authenticated to communicate data bi-directionally with said destination server in accordance with said session information.

38. A host based security method as set forth in claim 37 wherein said credential transmitting step transmits from said credential host over said network to said destination server additional information associated with said credentials, said additional information being associated with said user of said local computer such that said credentials are validated as being associated with said user.

39. A host based security method as set forth in claim 38 wherein an auxiliary device associated with said user is in communication with said credential host, said additional information being developed at said credential host in response to said auxiliary device being authenticated by said credential host.

40. A host based security method as set forth in claim 38 wherein said additional information is a token.

41. A host based security method as set forth in claim 40 wherein said token is encrypted using a key known only to said credential host and said destination server.

42. A host based security method as set forth in claim 40 wherein said token expires upon expiration of a selected time duration.

43. A host based security method as set forth in claim 37 wherein said session information includes at least one session cookie issued by said destination server upon authentication of said credentials and an address of a location at said destination server.

44. A host based security method as set forth in claim 37 wherein a computer-to-host communication session exists over said network between said local computer and said credential host and a host-to-site communication session exists over said network between said credential host and said destination server, and further wherein said request is a request to connect to said destination server transmitted from said local computer over said computer-to-host communication session and retransmitted from said credential host over said host-to-site communication session.

45. A host based security method as set forth in claim 44 wherein each of said communication session between said local computer and said destination server and said further communication session between said credential host and said local computer is an SSL session.

46. A host based security method as set forth in claim 44 wherein DNS settings of said local computer are pointed to DNS settings of said credential host such that said credential host resolves domains of said destination server and corresponding IP addresses of said destination server and routes said communication session with said domains through said credential host.

47. A host based security method as set forth in claim 44 wherein said local computer includes a proxy controlled by said credential host such that data communicated between said local computer and said destination server during said communication session is routed through said credential server for selected ones of URLs controlled by said credential host.

48. A host based security method as set forth in claim 44 wherein said local computer includes a proxy controlled by said credential host such that data communicated between said local computer and said destination server during said communication session is routed through said credential server.

49. A host based security method as set forth in claim 37 wherein said credentials include a User ID and an initial password associated with said local computer and originally registered with said destination server, said method further comprising the step of registering by said credential server upon said credentials being stored at thereat a subsequent password at said destination server to replace said initial password.

50. A host based security method as set forth in claim 49 wherein said credential server further stores private user information associated with said credentials, said private user information being available to said destination server during said communication session.

51. A host based security method as set forth in claim 37 further comprising the step of authenticating said local computer by said credential host to communicate therewith prior to said request being received from said local computer.

52. A host based security method as set forth in claim 51 wherein said authenticating step authenticates said local computer by auxiliary credentials received from a device associated with said user of said local computer wherein said device is in communication solely with said credential host.

53. A host based security method as set forth in claim 52 wherein said device from which said auxiliary credentials are received is selected in accordance with rules established by said user in accordance with said local computer currently operated by said user.

54. A host based security method as set forth in claim 37 wherein said credential transmitting step includes transmitting predefined information to a device associated with said user of said local computer contemporaneously with transmitting said credentials to said destination server.

55. A host based security method as set forth in claim 54 wherein said device is selected in accordance with said destination server.

56. A host based security method as set forth in claim 54 wherein said predefined information is transmitted only for a selected destination server.

57. A host based security method as set forth in claim 37 wherein said credential host maintains a transaction history.

58. A host based security method as set forth in claim 57 wherein said transaction history is user configurable.

59. A host based security method as set forth in claim 58 said transaction history includes an identification of said local computer in which said communication session has been established with said destination server.

60. A host based security method as set forth in claim 59 wherein said identification is determined by a cookie stored at said local computer.

61. A host based security method as set forth in claim 59 wherein said transaction history includes an identification of information accessed at said destination server.

62. A host based security method as set forth in claim 37 further comprising the step of sending from said credential host information personal to said user of said local computer to said destination server.

63. A host based security method as set forth in claim 62 wherein said personal information expires upon expiration of a selected time duration.

64. A host based security method as set forth in claim 62 wherein said personal information is an identification of a financial instrument.

65. A host based security method as set forth in claim 64 wherein said personal information is encrypted using a key known only to said credential host and said destination server.

66. A host based security method as set forth in claim 37 wherein said credential host in response to said user ID being received thereat signals said auxiliary device at which said user is prompted to enter said password.

67. A host based security method as set forth in claim 66 wherein said auxiliary device is one of a telephone and personal digital assistant and said password is a personal identification number.

68. A host based security method as set forth in claim 37 wherein said data to be communicated between said local computer and said destination server includes form fields to be transmitted from said destination server, said method further comprising the steps of routing said form fields from said credential host to said auxiliary device at which said user enters information into said form fields and transmitting from said auxiliary device said information entered into said form fields to said destination server, said auxiliary device associated with said user of said local computer, said auxiliary device being in communication with said credential host.

69. A host based security method as set forth in claim 68 wherein said form fields are pre-identified as always to be routed to said auxiliary device, said information to be entered into said form fields being associated with personal financial information of said user.

70. A host based security method as set forth in claim 37 wherein said local computer is operated by one of a plurality of users, said credentials associated with said local computer being unique for each of said users, said credentials being stored at said credential host in association with said destination server at which said credentials are to be authenticated and further in association each of said users such that said data to be communicated between said local computer and said destination server is further selectable in accordance with said credentials for each one of said users.

71. A host based security method as set forth in claim 37 wherein said destination server is non-supportive of receipt of said credentials from said credential host such that said destination server transmits to said local computer a form field into which said credentials are to be entered, said credential host storing an alphanumeric character string in association with said credentials, said string being entered into said form field and transmitted form said local computer, said credential host substituting said string for said credentials to transmit to said destination server.

72. A host based security method as set forth in claim 71 wherein said credential host stores personal information of said user of said local computer in association with a further alphanumeric character string and further wherein said destination server transmits to said local computer a further form field into which said personal information is normally entered, said further character string being enterable by said user at said local computer into said further form field and transmittable to said credential host, said credential host being operative to transmit said personal information associated with said character string in said further form field to said destination server in response to receipt of said character string.

\* \* \* \* \*